US009509908B2

(12) United States Patent
Saito et al.

(10) Patent No.: US 9,509,908 B2
(45) Date of Patent: *Nov. 29, 2016

(54) OMNIDIRECTIONAL CAMERA

(71) Applicant: Kabushiki Kaisha TOPCON, Itabashi-ku, Tokyo-to (JP)

(72) Inventors: Masahiro Saito, Tokyo-to (JP); Takeshi Ishida, Toyko-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 287 days.

This patent is subject to a terminal disclaimer.

(21) Appl. No.: 14/031,441

(22) Filed: Sep. 19, 2013

(65) Prior Publication Data

US 2014/0092207 A1    Apr. 3, 2014

(30) Foreign Application Priority Data

Oct. 2, 2012   (JP) .................................. 2012-220147

(51) Int. Cl.
*H04N 5/357*     (2011.01)
*H04N 5/232*     (2006.01)

(52) U.S. Cl.
CPC ........ *H04N 5/23238* (2013.01); *H04N 5/3572* (2013.01)

(58) Field of Classification Search
None
See application file for complete search history.

(56) References Cited

U.S. PATENT DOCUMENTS

| | | | |
|---|---|---|---|
| 6,094,510 A | 7/2000 | Yaguchi et al. | |
| 6,661,454 B1* | 12/2003 | Hwang | H04N 5/772 |
| | | | 348/231.1 |
| 6,990,240 B2* | 1/2006 | Hagiwara | G06T 9/007 |
| | | | 382/232 |
| 7,415,166 B2* | 8/2008 | Kubota | H04N 1/3872 |
| | | | 382/284 |
| 7,539,356 B2* | 5/2009 | Igari | G06T 3/4038 |
| | | | 345/629 |
| 7,552,025 B2 | 6/2009 | Ohtomo et al. | |

(Continued)

FOREIGN PATENT DOCUMENTS

| | | |
|---|---|---|
| EP | 0908755 A1 | 4/1999 |
| JP | 5-35587 A | 2/1993 |

(Continued)

OTHER PUBLICATIONS

Japanese communication issued Jan. 29, 2015 in co-pending Japanese patent application No. 2011-112047.

(Continued)

*Primary Examiner* — Reza Aghevli
(74) *Attorney, Agent, or Firm* — Nields, Lemack & Frame, LLC

(57) ABSTRACT

An omnidirectional camera comprises a camera having an image pickup element for acquiring a digital image, an image data processing device for compressing signals from the camera and for converting the signal to an image signal, and an external memory. The image data processing device has a signal processing unit, a writing changeover unit, a set of two first internal memories, a signal compensation unit, a data conversion unit, a third internal memory for temporarily storing the outputted data, and an input/output control unit for controlling the input/output of the data between the third internal memory and the external memory. The writing changeover unit accumulates signals outputted from the signal processing unit in one of the first internal memories until the signals are accumulated to a predetermined amount, and then, the writing changeover unit changes the destination of accumulation and repeatedly accumulates in the other first internal memory.

9 Claims, 6 Drawing Sheets

(56) References Cited

U.S. PATENT DOCUMENTS

| | | | |
|---|---|---|---|
| 7,693,393 B2* | 4/2010 | Ohnishi | G11B 27/36 386/270 |
| 7,734,104 B2* | 6/2010 | Yamane | H04N 19/172 382/232 |
| 8,423,704 B2* | 4/2013 | Morgan | H04N 5/772 348/207.99 |
| 8,545,396 B2* | 10/2013 | Cover | A61B 1/00016 600/101 |
| 8,639,045 B2* | 1/2014 | Yokomitsu | H04N 1/415 375/240.12 |
| 8,643,753 B2* | 2/2014 | Li | H04N 5/378 348/284 |
| 2002/0001410 A1 | 1/2002 | Hagiwara | |
| 2004/0196390 A1 | 10/2004 | Shimazu et al. | |
| 2005/0093886 A1 | 5/2005 | Kubota | |
| 2006/0041886 A1 | 2/2006 | Shintani | |
| 2006/0140578 A1 | 6/2006 | Ohnishi | |
| 2007/0121720 A1 | 5/2007 | Yamane et al. | |
| 2007/0124783 A1* | 5/2007 | Ahiska | H04N 5/23206 725/105 |
| 2007/0167154 A1 | 7/2007 | Ohtomo et al. | |
| 2007/0216810 A1* | 9/2007 | Min | H04M 1/72544 348/586 |
| 2008/0088719 A1* | 4/2008 | Jacob | H04N 5/2256 348/241 |
| 2008/0139881 A1 | 6/2008 | Cover et al. | |
| 2009/0231466 A1 | 9/2009 | Morgan et al. | |
| 2012/0147959 A1 | 6/2012 | Amano et al. | |
| 2012/0293612 A1 | 11/2012 | Ishida et al. | |

FOREIGN PATENT DOCUMENTS

| | | |
|---|---|---|
| JP | 5-191781 A | 7/1993 |
| JP | 6-268955 A | 9/1994 |
| JP | 9-163182 A | 6/1997 |
| JP | 2000-23013 A | 1/2000 |
| JP | 2000-261759 A | 9/2000 |
| JP | 2002-16870 A | 1/2002 |
| JP | 2005-12619 A | 1/2005 |
| JP | 2005-353193 A | 12/2005 |
| JP | 2006-87069 A | 3/2006 |
| JP | 2006-197181 A | 7/2006 |
| JP | 2007-171048 A | 7/2007 |
| JP | 3956360 B2 | 8/2007 |
| JP | 4270543 B2 | 6/2009 |
| JP | 2012-244375 A | 12/2012 |

OTHER PUBLICATIONS

Office Action mailed Jan. 7, 2015 in co-pending U.S. Appl. No. 13/466,604.
Final Rejection mailed May 4, 2015 in co-pending U.S. Appl. No. 13/466,604.
European communication dated May 28, 2015 in co-pending European patent application No. 12167808.0.
Journal of Real-Time Image Processing, Aug. 2006, vol. 1, No. 1, pp. 63-68, "High-speed JPEG coder implementation for a smart camera", Van Dyck, et al.
Topcon Corporation, IP-S2 Lite, Mobile Mapping System, Product Information, 2011, 4 pages.
Topcon Corporation, IP-S2, Mobile Survey System, Product Information, 2010, 6 pages.
Extended European Search Report mailed Jun. 28, 2013 in co-pending European patent application No. EP 12167808.0.
Canadian communication, dated Jul. 30, 2015 in corresponding Canadian patent application No. 2,827,934.
Office action mailed May 3, 2016 in co-pending U.S. Appl. No. 13/466,604.

* cited by examiner

OMNIDIRECTIONAL CAMERA

BACKGROUND OF THE INVENTION

The present invention relates to an omnidirectional camera, which is provided with a plurality of cameras and is used for picking up an omnidirectional image.

As map information or the like for navigator, image data along a route are acquired, and further, a measurement is performed based on the images acquired. An omnidirectional camera is used for acquiring such images. The omnidirectional camera is installed on a ceiling of a mobile vehicle such as an automobile or the like, and while the mobile vehicle is moving, the omnidirectional camera picks up images of structures and sceneries or the like along the route.

For such purpose, a speed to sequentially take in the images acquired by the omnidirectional camera must correspond to a moving speed of the mobile vehicle, and the speed of the mobile vehicle is limited to the speed to take in the images.

Further, the signal itself as outputted from an image pickup element of the omnidirectional camera is not an image data and the signal is an enormous amount of data. Therefore, for the purpose of storing the data as image data, the data must be converted to image data and the data must also be compressed.

Referring to FIG. 7, description will be given below on a conventional type image data processing device which compresses the data outputted from the camera (image pickup element) as image data. To simplify the explanation, it is supposed that the processing of the data is performed on the data outputted from one camera.

In FIG. 7, reference numeral 1 represents an image data processing device, reference numeral 2 represents a photodetection signal to be outputted from a camera, reference numeral 3 represents an external memory, and reference numeral 4 represents a CPU. Describing more concretely, the photodetection signal 2 is a photodetection signal outputted from pixel of image pickup element of the camera. As the external memory 3, DRAM (Dynamic Random Access Memory) such as DDR2 (Double Data Rate 2) or the like is used, for instance.

The image data processing device 1 primarily comprises a signal processing unit 5, a first internal memory 6, an input/output control unit 7, a memory controller 8, a second internal memory 9, a data conversion unit 10, a third internal memory 11, a fourth internal memory 12, an image data input/output unit 13, and an internal register 14.

The photodetection signal 2 is inputted to the signal processing unit 5. The signal processing unit 5 converts the photodetection signal 2 as inputted from a serial signal to a parallel signal. After carrying out signal processing as required such as conversion of number of bits or the like, the signals are outputted to the first internal memory 6.

The first internal memory 6 temporarily stores the signals until the inputted signals reach a predetermined amount. Here, the predetermined amount is "2048 pixels×16", for instance. When the stored data amount reaches "2048 pixels×16", the data are written into the external memory 3 via the input/output control unit 7 and the memory controller 8. In this case, the memory controller 8 controls a timing to write the data into the external memory 3 and a region of the external memory 3, where the data are written.

The external memory 3 has a photodetection signal storage region where the photodetection signals 2 are stored and an image data storage region where the image data are stored. The signals outputted from the first internal memory 6 are stored in the photodetection storage region via the input/output control unit 7 and the memory controller 8 (arrow mark "a" in FIG. 7).

The photodetection signals 2 are continuously inputted to the first internal memory 6, and the signals stored in the first internal memory 6 are written in the external memory 3 via the memory controller 8 each time the data reaches the predetermined amount, and the data are stored in the external memory 3. When the stored data reach an amount corresponding to one frame, the input/output control unit 7 cuts out the data by a predetermined amount out of amount for one frame (e.g. "2048 pixels×16") via the memory controller 8, and the data are outputted to the second internal memory 9 (arrow mark "b" in FIG. 7).

The data conversion unit 10 is a JPEG encoder, for instance, and the signals accumulated in the second internal memory 9 are compressed and converted to image data of JPEG. The image data as converted are temporarily stored in the third internal memory 11, and the data are written into the external memory 3 from the input/output control unit 7 at required timing which is controlled by the memory controller 8.

The data of each predetermined amount are compressed and converted to image data at the data conversion unit 10 and the data are sequentially written into the external memory 3. When the image data thus converted reach the amount of one frame, the data are stored in the image data storage region as image data of one frame (arrow mark "c" in FIG. 7).

Next, in a case where the CPU 4 carries out measurement or the like according to the image data, a reading command is issued to the input/output unit 7 via the image data input/output unit 13, and image data are read out via the memory controller 8 (arrow mark "d" in FIG. 7). The image data are outputted to the CPU 4 via the fourth internal memory 12 and the image data input/output unit 13.

In the image data processing device 1 as described above, it is so arranged that data of large capacity of one frame are inputted and outputted by as many as four times between the image data processing device 1 and the external memory 3. Also, image compression and conversion are carried out for each frame. As a result, an image processing is naturally performed with a delay of one frame.

Incidentally, in the image data processing device 1 as described above, a wide angle lens is used as lens optical system in each of the cameras which constitute an omnidirectional camera, and an image pickup element is provided corresponding to each of the wide angle lenses. For this reason, the image to be acquired by each of the image pickup elements is brighter near the center of the lens optical system while it is darker at peripheral parts. Omnidirectional image is made up by synthesizing the images, each of which is acquired by each individual image pickup element. In a case where there is a difference of brightness in each of the images, the brightness of the images will be ununiform when omnidirectional images are made up, and the ununiformity is not desirable.

Also, giving and taking of the data to and from the external memory 3 cause a bottleneck in the conventional type image data processing. Further, from the reason that there is a time lag for one frame in the conversion or the compression of the image data or the like, the speed to take in the images acquired by the camera has been limited. Also, in the case such as the omnidirectional camera where there are the plurality of cameras and images are acquired at the same time by the plurality of cameras, limitation on the speed to take in the image has been a big problem. In addition, a vast amount of calculation time is required for the purpose of compensating the ununiformity of the brightness of the images by image processing.

SUMMARY OF THE INVENTION

It is an object of the present invention to provide an omnidirectional camera, by which it is possible to improve uniformity of the lightness of images and to perform image conversion of the data acquired by the camera at higher speed.

To attain the above object, an omnidirectional camera according to the present invention comprises a camera having an image pickup element and used for acquiring a digital image, an image data processing device for compressing signals outputted from the camera and for converting the signal to an image signal, and an external memory, wherein the image data processing device has a signal processing unit for taking in the signal, a writing changeover unit, a set of two first internal memories, a signal compensation unit having a compensation coefficient for compensating signals from the first internal memories, a data conversion unit for converting the compensated signal from the signal compensation unit to an image signal, a third internal memory for temporarily storing the data after conversion outputted from the data conversion unit, and an input/output control unit for controlling the input/output of the data between the third internal memory and the external memory, wherein the writing changeover unit accumulates signals outputted from the signal processing unit in one of the first internal memories until the signals are accumulated to a predetermined amount, and when the signals are accumulated to the predetermined amount, the writing changeover unit changes the destination of accumulation and repeatedly accumulates in other first internal memories, and signals are outputted to the signal compensation unit from the first internal memory where signals have been accumulated to the predetermined amount, the signal compensation unit compensates the inputted signals based on the compensation coefficient corresponding to a position within the image pickup element, outputs compensated signals to the data conversion unit, the data conversion unit compresses and converts the inputted compensated signal to an image signal, and the image signal is sequentially inputted to the external memory by the input/output control unit.

Further, in an omnidirectional camera according to the present invention, there are provided two or more cameras, and the signal processing unit, the writing changeover unit, a set of two of the first internal memories, the signal compensation unit, the data conversion unit, the third internal memory are provided as many as the number of cameras to correspond to the number of cameras.

Further, in an omnidirectional camera according to the present invention, the input/output control unit comprises a request mediating unit for giving priority ranking to each two or more writing requests inputted from the third internal memory, and a data stocking unit for temporarily storing the data outputted from the data conversion unit and converted data corresponding to the writing request, wherein the data after conversion is written in the external memory according to the priority ranking as given.

Further, in an omnidirectional camera according to the present invention, the signal compensation unit carries out shading compensation to brightness of the image derived from optical system of the lens based on the compensation coefficient.

Further, in an omndiretional camera according to the present invention, the compensation coefficient is calculated according to a distance from a position where the luminance is at the maximum when a reference light is projected and also according to the decrease of brightness corresponding to the distance.

Further, in an omnidirectional camera according to the present invention, the relation between the compensation coefficient and the distance is represented by a train of approximate straight lines.

Further, in an omnidirectional camera according to the present invention, the relation between the compensation coefficient and the distance is represented by complex curves.

Further, in an omnidirectional camera according to the present invention, the compensation coefficient is obtained from a table having the distance and a compensation coefficient corresponding to the distance.

Further, in an omnidirectioncal camera according to the present invention, the predetermined amount of the accumulated data is an amount of minimal unit compressible by the data conversion unit.

According to the present invention, an omnidirectional camera comprises a camera having an image pickup element and used for acquiring a digital image, an image data processing device for compressing signals outputted from the camera and for converting the signal to an image signal, and an external memory, wherein the image data processing device has a signal processing unit for taking in the signal, a writing changeover unit, a set of two first internal memories, a signal compensation unit having a compensation coefficient for compensating signals from the first internal memories, a data conversion unit for converting the compensated signal from the signal compensation unit to an image signal, a third internal memory for temporarily storing the data after conversion outputted from the data conversion unit, and an input/output control unit for controlling the input/output of the data between the third internal memory and the external memory, wherein the writing changeover unit accumulates signals outputted from the signal processing unit in one of the first internal memories until the signals are accumulated to a predetermined amount, and when the signals are accumulated to the predetermined amount, the writing changeover unit changes the destination of accumulation and repeatedly accumulates in other first internal memories, and signals are outputted to the signal compensation unit from the first internal memory where signals have been accumulated to the predetermined amount, the signal compensation unit compensates the inputted signals based on the compensation coefficient corresponding to a position within the image pickup element, outputs compensated signals to the data conversion unit, the data conversion unit compresses and converts the inputted compensated signal to an image signal, and the image signal is sequentially inputted to the external memory by the input/output control unit. As a result, reading of the data from the camera and compression/conversion of the data are carried out in parallel to each other. This makes it possible to reduce the number of the procedures to give and take the data to and from the external memory and to extensively reduce the time required for compression and conversion of the data. Light amount distribution caused from the lens optical system can be compensated, and the uniformity of the brightness of the images can be improved at the same time.

Further, according to the present invention, in an omnidirectional camera, there are provided two or more cameras, and the signal processing unit, the writing changeover unit, a set of two of the first internal memories, the signal compensation unit, the data conversion unit, the third internal memory are provided as many as the number of cameras to correspond to the number of cameras. As a result, compression/conversion of the signals from each of the cameras can be separately carried out and the time required for conversion is shortened. This contributes to the accomplishment of higher image pickup speed on the omnidirectional camera.

Further, according to the present invention, in the omnidirectional camera, the input/output control unit comprises a request mediating unit for giving priority ranking to each two or more writing requests inputted from the third internal memory, and a data stocking unit for temporarily storing the data outputted from the data conversion unit and converted data corresponding to the writing request, wherein the data after conversion is written in the external memory according to the priority ranking as given. As a result, the writing of the data to the external memory can be smoothly accomplished without delay.

Further, according to the present invention, in an omnidirectional camera, the signal compensation unit carries out shading compensation to brightness of the image derived from optical system of the lens based on the compensation coefficient. As a result, the brightness in the external region of the image having less photodetection light amount can be set to the same brightness as the brightness at the center of the image having higher photodetection light amount, and this leads to the improvement of uniformity of the brightness of the images.

Further, according to the present invention, in an omnidirectional camera, the compensation coefficient is calculated according to a distance from a position where the luminance is at the maximum when a reference light is projected and also according to the decrease of brightness corresponding to the distance. As a result, it is possible to improve the uniformity of the brightness of the images by compensating the light amount distribution based on the compensation coefficient.

Further, according to the present invention, in an omnidirectional camera, the relation between the compensation coefficient and the distance is represented by a train of approximate straight lines. As a result, it is possible to rapidly calculate the compensation coefficient.

Further, according to the present invention, in an omnidirectional camera, the relation between the compensation coefficient and the distance is represented by complex curves. As a result, the compensation coefficient can be accurately calculated.

Further, according to the present invention, in an omnidirectional camera, the compensation coefficient is obtained from a table having the distance and a compensation coefficient corresponding to the distance. As a result, the compensation coefficient can be obtained rapidly and accurately by substituting the distance into the table.

Furthermore, according to the present invention, in an omnidirectional camera, the predetermined amount of the accumulated data is an amount of minimal unit compressible by the data conversion unit. As a result, the capacity of the internal memory may be small. Further, because it is compression and conversion of the data of the minimum unit, compression and conversion of the data at one time can be completed within a short period of time, and taking in of the data and compression and conversion of the data can be carried out at the same time.

BRIEF DESCRIPTION OF THE DRAWINGS

FIG. 3A shows an image in a case where shading compensation is not performed, and FIG. 3B shows an image in a case where shading compensation is performed.

DETAILED DESCRIPTION OF THE PREFERRED EMBODIMENT

Description will be given below on an embodiment of the present invention by referring to the attached drawings.

Figure 1:
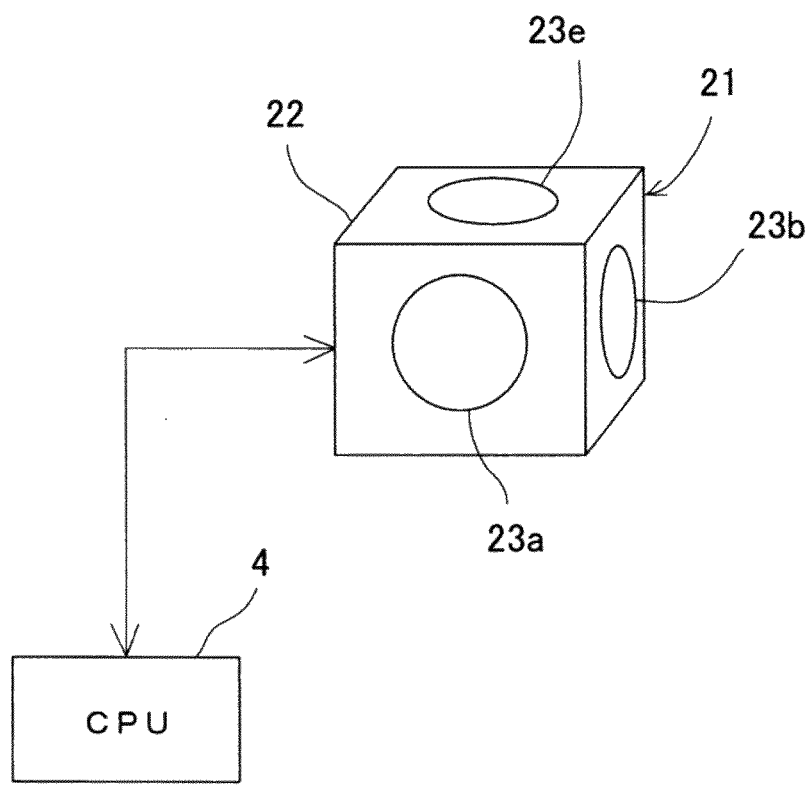
FIG. 1 is a schematical drawing of an omnidirectional camera according to an embodiment of the invention.

First, referring to FIG. 1, description will be given on an example of an omnidirectional camera 21, in which the present invention is applied.

On four lateral surfaces running in vertical direction of a camera housing 22, cameras 23a, 23b, 23c and 23d (cameras 23c and 23d are not shown in the figure) for picking up a digital image respectively are provided, and a camera 23e for picking up a digital image is provided on a ceiling surface. An omnidirectional image can be acquired by the cameras 23a, 23b, 23c and 23d. An image in upward direction can be acquired by the camera 23e, and images in all directions except in downward direction can be acquired by the cameras 23a, 23b, 23c and 23d and by the camera 23e. Further, it is so arranged that a panoramic image over total circumference can be prepared by synthesizing images picked up by the cameras 23a, 23b, 23c and 23d.

It is to be noted that, optical system of each of the cameras 23a, 23b, 23c and 23d has a wide angle lens so that images adjacent to each other are overlapped by a predetermined amount when the images of the cameras 23a, 23b, 23c and 23d are synthesized. Optical system of the camera 23e also has a wide angle lens so that there is no lacking portion between an image acquired in upward direction and the omnidirectional image.

Inside the camera housing 22, an image data processing device 20 (see FIG. 2) is accommodated. Signals acquired by the cameras 23a, 23b, 23c and 23d and by the camera 23e are sent to the image data processing device 20 respectively, and it is so designed that the data are compressed in the image data processing device 20 and are converted to images. Also, the camera housing 22 is designed in watertight structure so that the camera housing 22 can be mounted on a ceiling of an automobile, for instance.

Figure 7:
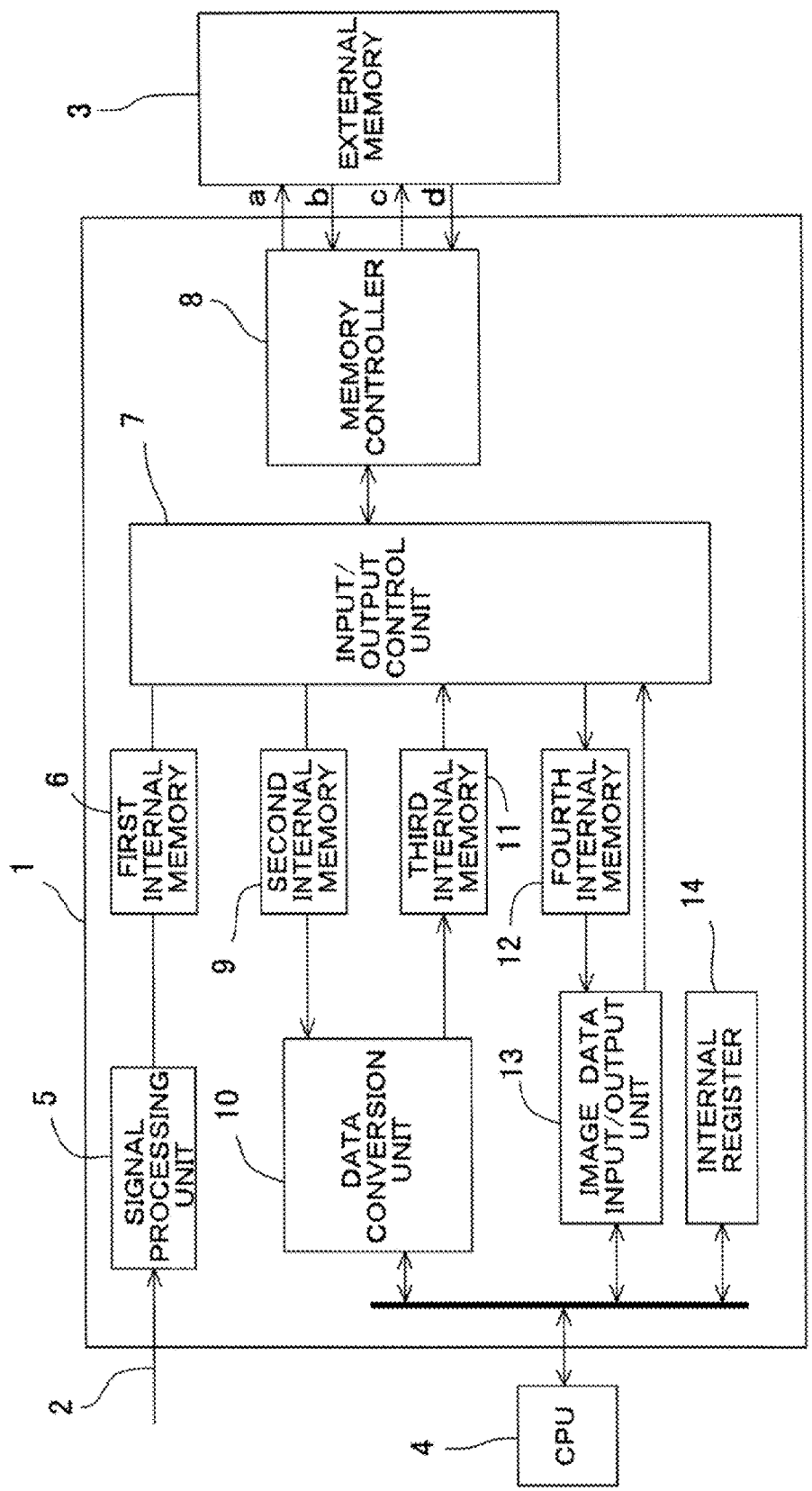
FIG. 7 is a block diagram of a conventional image data processing device.

Next, by referring to FIG. 2, description will be given on the image data processing device 20 according to the present embodiment. It is to be noted that in FIG. 2, the same component as shown in FIG. 7 is referred by the same symbol, and detailed description is not given here.

The image data processing device 20 primarily comprises a signal processing unit 5, a writing changeover unit 25, two first internal memories 6a and 6b provided on each of the cameras respectively, a shading compensation unit 24 serving as a signal compensation unit, a data conversion unit 10, an input/output control unit 7, a memory controller 8, a third internal memory 11, a fourth internal memory 12, an image data input/output unit 13, and an internal register 14.

Because a processing of each individual signal as outputted from the cameras 23a, 23b, 23c and 23d and from the camera 23e is the same, description will be given here on processing regarding a photodetection signal 2 outputted from the camera 23a. Further, the signals outputted from the cameras 23a, 23b, 23c and 23d and from the camera 23e are signals from each of image pickup elements 16 respectively.

The photodetection signal 2 from the camera 23a is inputted to the signal processing unit 5. The signal processing unit 5 converts the inputted photodetection signal 2 from a serial signal to a parallel signal and to 8-bit signal.

Signals from the signal processing unit 5 are by turns and alternatively inputted to either one of the first internal memories 6a or 6b via the writing changeover unit 25 by a predetermined amount, and are accumulated in the first internal memories 6a and 6b. In this case, the predetermined amount of data to be accumulated in each of the first internal memories 6a and 6b is extremely lower than capacities of the data for one frame of image or extremely lower than the capacities of the first internal memories 6a and 6b. Preferably, the predetermined data amount is minimum unit data which is compressed at the data conversion unit 10 and converted to image data, the data amount of "8 pixels×8" for instance.

Each time the data amount as accumulated at the first internal memories 6a and 6b reaches "8 pixels×8", the data are outputted to the shading compensation unit 24, and the data are outputted to the data conversion unit 10 after the data are compensated at the shading compensation unit 24. Therefore, data of "8 pixels×8" are alternately inputted to the data conversion unit 10 via the shading compensation unit 24 from the first internal memories 6a and 6b.

The writing changeover unit 25 controls accumulation and release of the data of the first internal memories 6a and 6b. For instance, in a case where the data are written in the first internal memory 6a, the data are outputted from the first internal memory 6b to the shading compensation unit 24. When the data to be sent to the first internal memory 6a reaches the predetermined amount (8 pixels×8), the data are to be written to the first internal memory 6b, and the data accumulated in the first internal memory 6a are outputted to the shading compensation unit 24.

Now, description will be given below on shading compensation by the shading compensation unit 24.

Each of the images acquired by the cameras 23a, 23b, 23c and 23d used in the omnidirectional camera 21 has a predetermined amount of overlapping region. By synthesizing the overlapping regions to each other, an omnidirectional image is prepared. In this case, an image of the overlapping region is picked up by a light, which passes through the outer region of the lens in the optical system of the camera.

Figure 3A:
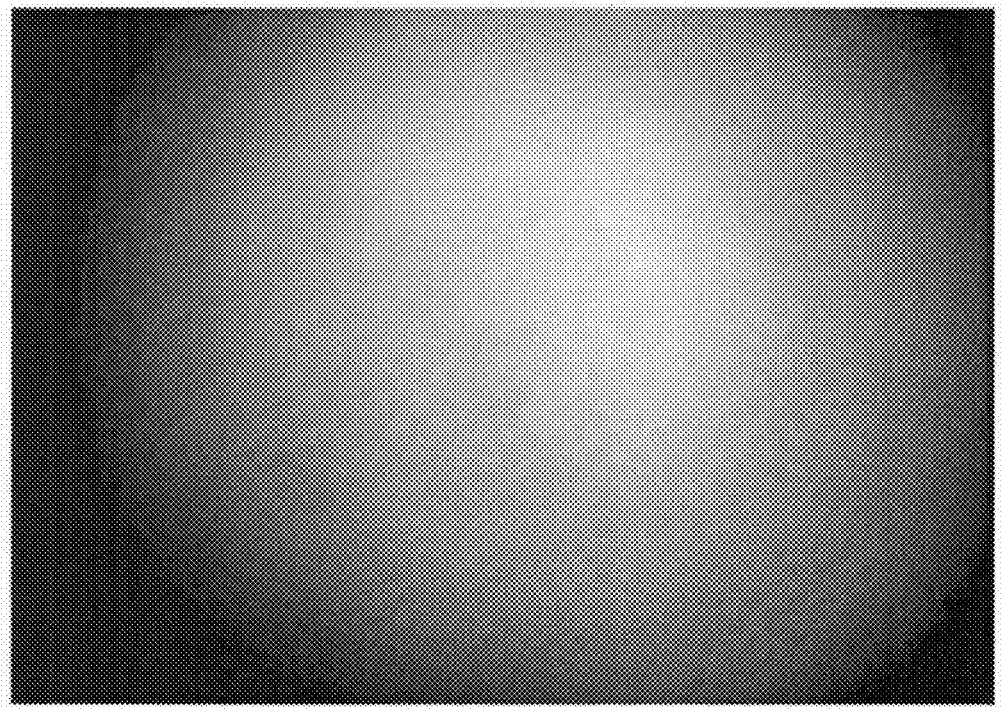
FIG. 3A and FIG. 3B are explanatory drawings to explain shading compensation according to an embodiment of the invention.

In many cases, wide angle lens is used in the optical system of the omnidirectional camera 21. In this case, photodetection light amount of pixel region where the light passing through the outer side of the lens received is decreased. As shown in FIG. 3A, a taken image by the camera has darker image on peripheral region. That is, the taken image is an image having such light amount distribution that it is brighter at the central region and darker in the peripheral region.

For this reason, in the present embodiment, the shading compensation unit 24 is provided, and compensation coefficient (compensation multiplying factor) corresponding to a position on the image pickup element 16 is calculated. Then, the photodetection signal 2 is compensated by the compensation coefficient thus calculated, and the light amount distribution caused by the lens optical system is decreased.

Now, by referring to FIG. 4 and FIG. 5, description will be given below on calculation of compensation coefficient when the shading compensation is performed.

To an object to be measured, which has the same reflection characteristics over the entire image pickup region and has a surface perpendicularly crossing the image pickup light optical axis, e.g. a wall surface in white color, an illumination light is projected from a reference light source, and the image of the object to be measured when the illumination light is projected is picked up by the camera 23a. In this case, it is preferable that the image pickup light optical axis of the camera 23a coincides with illumination light optical axis of the reference light source.

Pixel of the image center of the image acquired is set as a center point 26, and the center point 26 is regarded to be the standard pixel having the highest brightness. Further, the brightnesses of a plurality of pixels, which are located at a position separated from the center point 26 by 20 pixels, for instance and are on the same circumference having a radius of 20 pixels, are calculated, and average value of the brightnesses of the pixel thus calculated is regarded as the brightness of a pixel A, which is separated by 20 pixel from the center point 26. Next, it is calculated how dark is the brightness of the pixel A compared with the brightness of the central point 26, and based on the result of calculation, compensation coefficient is calculated so that the brightness of the pixel A is the same brightness as the center point 26.

It is supposed here that a pixel, which is at the same distance as a distance from the center point 26 to the pixel A, has the same brightness as that of the pixel A.

Similarly, average brightness of a plurality of pixels over the same circumference is determined every predetermined pixel interval, e.g. for the interval of each 20 pixels from the center point 26. Further, the pixels positioned over each circumference are set to be pixel B, pixel C, . . . , pixel N, and the brightness of the pixel B to pixel N is calculated. Then, it is further calculated how dark it is compared with the brightness of the center point 26, and based on the result of calculation, compensation coefficients are calculated respectively so that the pixel B to pixel N has the same brightness as the brightness of the center point 26.

Figure 4:
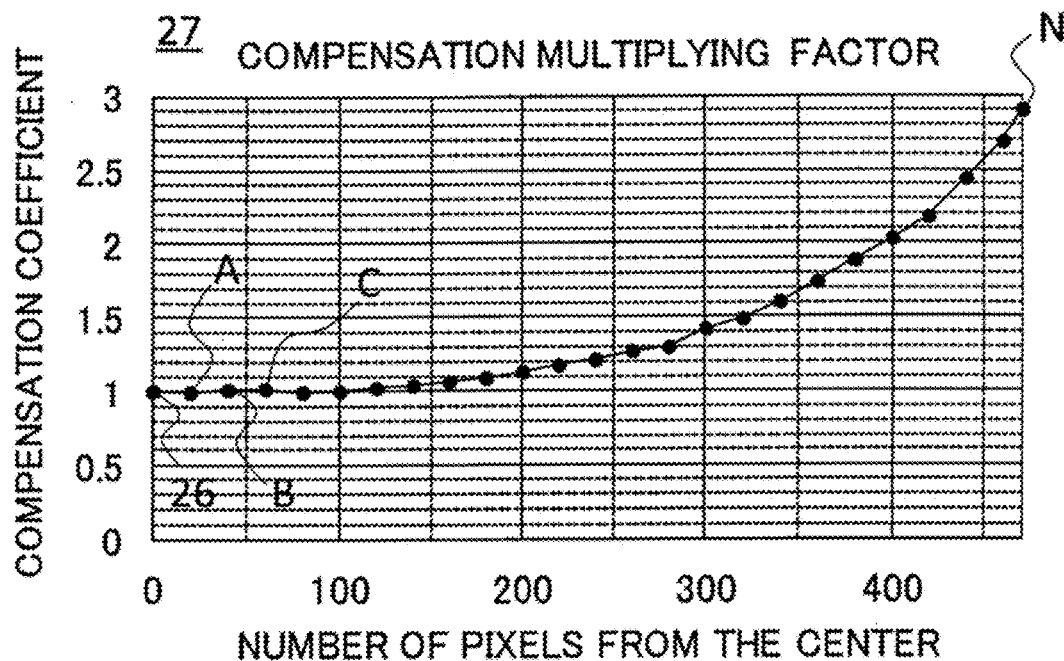
FIG. 4 is a graph to explain a relation between a compensation coefficient used for shading compensation and a distance from a center point.

In FIG. 4, reference numeral 27 shows a graph where a relation between the position of the pixel and compensation coefficient in a case where a distance X from the center point 26 is taken as an axis of abscissa and compensation coefficient Y is taken as an axis of ordinate. The graph 27 shows a train of approximate straight lines for each 20-pixel interval, and each approximate expression is represented by a linear equation. Therefore, by substituting a distance from the center point 26 of the pixel into approximate expression of the pixel, which is present at an arbitrary position of the image pickup element 16, compensation coefficient of the photodetection signal 2 to match the pixel can be quickly calculated.

Figure 5:
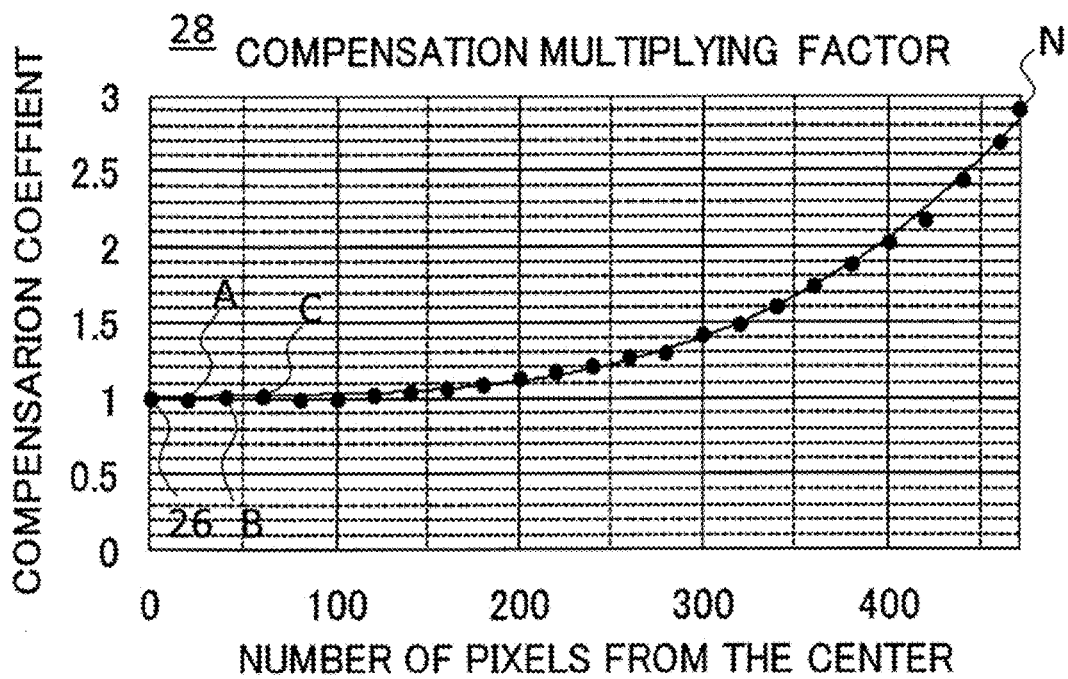
FIG. 5 is a graph to explain a relation between a compensation coefficient used for shading compensation and a distance from the center point.

Further, in FIG. 5, reference numeral 28 shows a graph where a relation between the position of the pixel and compensation coefficient is represented by approximate expression in a case where a distance X from the center point 26 is taken as axis of abscissa and compensation coefficient Y is taken as axis of ordinate. The graph 28 is given by the equation given below, for instance.

$$Y=0.0000000269X^3-0.0000056615X^2+0.0006002679X+1 \quad \text{(Equation 1)}$$

The relation between the distance X and the compensation coefficient Y is expressed by an approximate expression of tertiary complex curve as given in the above (Equation 1). By substituting a distance from the center point 26 of the pixel into the above approximate expression, which is present at an arbitrary position of the image pickup element 16, the compensation coefficient corresponding to the photodetection signal 2 of the pixel can be even more accurately determined. Also, it may be so arranged that approximate straight lines are determined for each predetermined interval based on the tertiary expression as given above, and approximate expression may be determined as a train of approximate straight lines. It is to be noted that the approximate curve to represent the relation between the position of the pixel and the compensation coefficient may be a complex curve of quaternary or more.

In a case where the image pickup light optical axis of the camera 23a does not coincides with illumination light optical axis of the reference light source, it may be so arranged that the pixel with the highest brightness among the images acquired is detected and the pixel thus detected is used as the center point 26.

Further, in the above, compensation coefficient of the pixel, which is at an arbitrary distance from the center point 26, is calculated by using the approximate expression, while a method other than the approximate expression may be used. For instance, a table, where distance from the center point 26 and compensation coefficient corresponding to the distance are set up, may be prepared in advance for each camera 23, and based on the distance from the center point 26, compensation coefficient of the pixel at an arbitrary position from the table may be determined. By substituting a distance between the pixel and the center point 26 to the table, compensation coefficient corresponding to the photodetection signal 2 of the pixel can be quickly and accurately determined.

When the shading compensation unit 24 performs shading compensation with respect to the signal inputted from one of the internal memories 6 based on the compensation coefficient thus calculated, light amount distribution caused by lens optical system can be compensated. Further, the signal of "8 pixels×8" after shading compensation has been performed is outputted to the data conversion unit 10 as a signal already compensated.

The data conversion unit 10 performs compression and conversion on the compensated signals of "8 pixels×8" to image data, which have been inputted from one of the first internal memories 6 and are shaded and compensated by the shading compensation unit 24. For instance, the compensated signals of "8 pixels×8" are converted to image data of JPEG, and outputted to the third internal memory 11. The third internal memory 11 temporarily stores the image data until output instruction is given from the input/output control unit 7.

Here, data conversion by the data conversion unit 10 is minimum unit of image data conversion, and conversion can be carried out at high speed. Further, if it is set in such a manner that conversion speed (time period required for conversion) is set to a time period shorter than the time period, during which the data of the photodetection signal 2 is accumulated in one of the first internal memories 6a and 6b, there is no waiting time for the output of the data from the first internal memories 6a and 6b to the data conversion unit 10, and taking in of the data from the signal processing unit 5, conversion of the data to the image data and compression of the data are carried out concurrently at real time.

Figure 2:
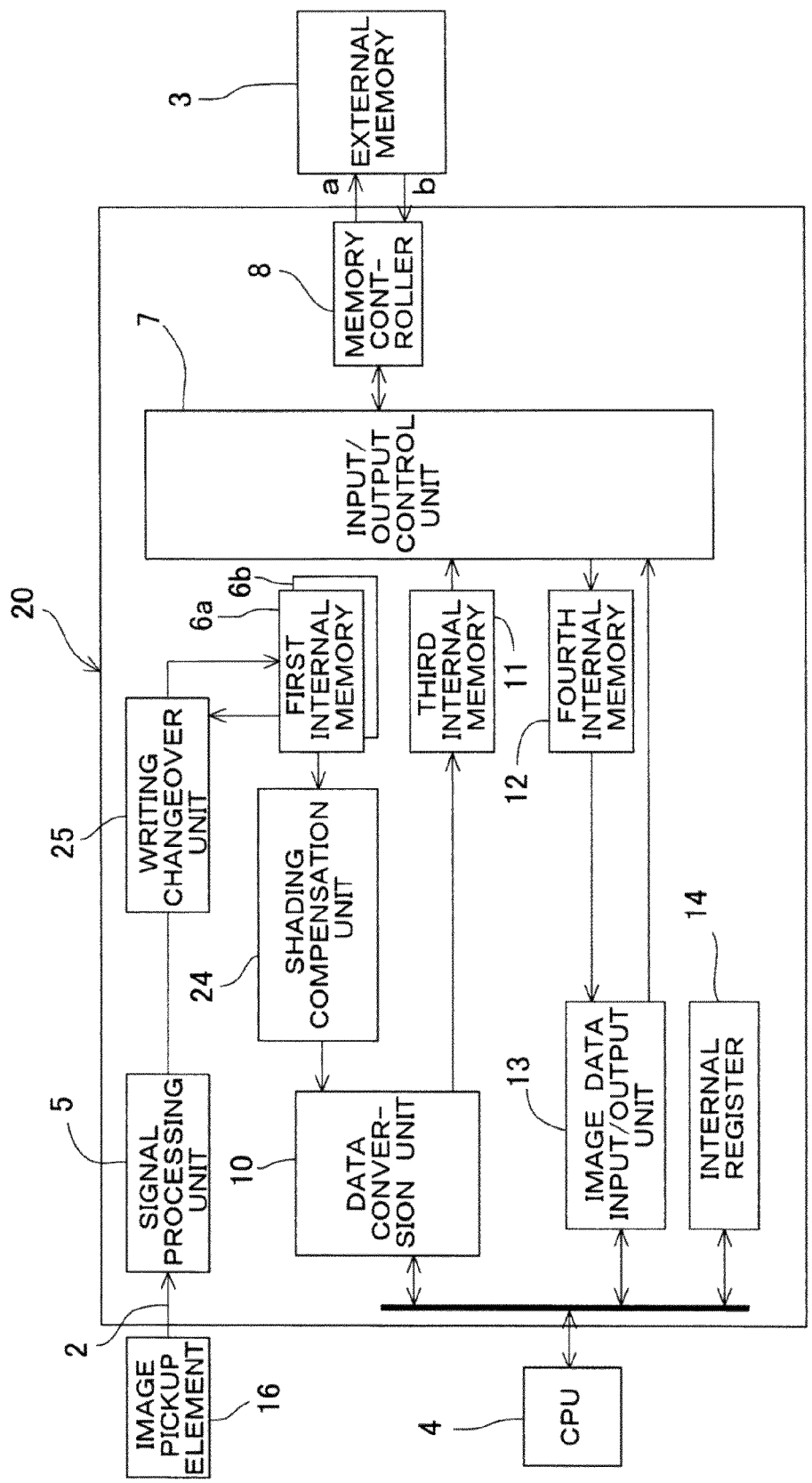
FIG. 2 is a schematical block diagram of an image data processing device to be used in the omnidirectional camera.

The input/output control unit 7 sequentially writes the image data of the minimum unit as sequentially converted by the data conversion unit 10, to the region and to the address as required of the external memory 3 and at a predetermined timing via the memory controller 8 (arrow mark "a" in FIG. 2). When the written data reaches one frame, the memory controller 8 changes the region and the address where the data are to be written and controls so that image data for each frame will be completed within the external memory 3.

In a case where measurement or other operations are to be carried out based on the image data, data reading request is issued from the CPU 4. In response to the data reading request, each of the input/output control unit 7 and the memory controller 8 outputs the image data stored in the external memory 3 by a predetermined unit (arrow mark "d" in FIG. 2). The data amount in this case is in such an amount that the data can be stored in the fourth internal memory 12, e.g. 2048 pixels×16, etc. The image data thus read out are outputted at a predetermined timing to the image data input/output unit 13.

Figure 3B:
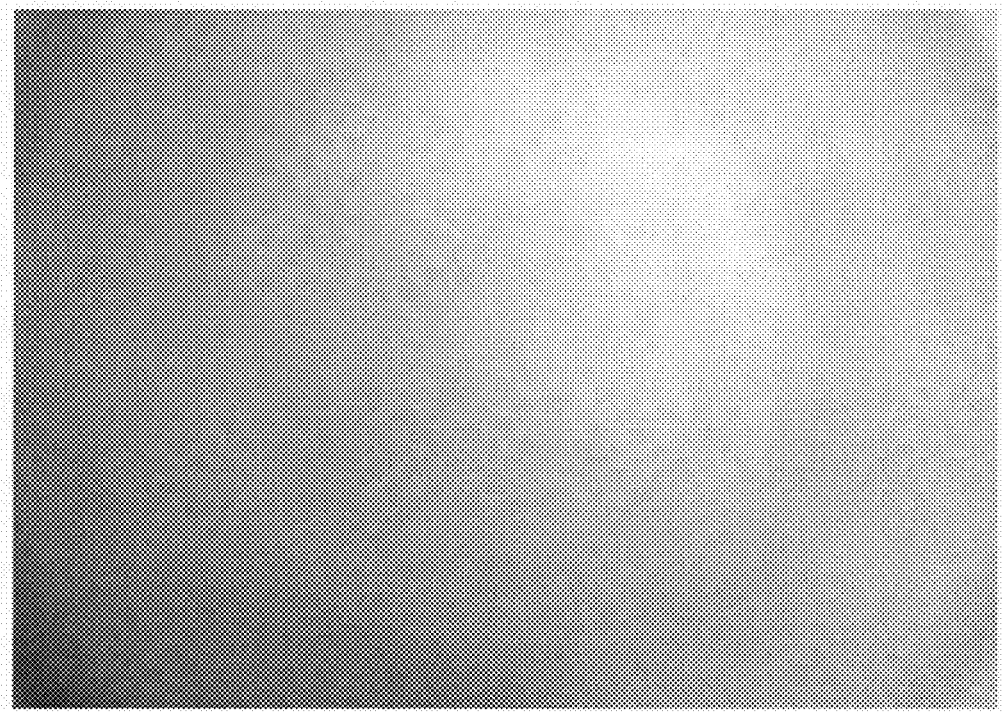

In the image data for one frame thus outputted, light amount distribution caused by the lens optical system is compensated. As a result, the image data for one frame thus outputted is an image with lower light amount distribution and with uniform brightness as shown in FIG. 3B.

As described above, in the present embodiment, the shading compensation unit 24 is provided on the image data processing device 20, and the photodetection signal 2 from the camera 23a is compensated by the shading compensation unit 24. Therefore, photodetection light amount distribution caused by the lens optical system is compensated. As a result, even when there is a pixel region with less photodetection light amount, it is possible to improve the uniformity of brightness of the image.

Further, two first internal memories 6 are used as one set and the data can be accumulated alternately and data conversion is performed while the other of the internal memories is accumulating the data. As a result, there is no need to accumulate the data for one frame in the eternal memory 3. This eliminates the procedure of giving and taking of the data between the external memory 3 and the image data processing device 20, which has been a bottleneck in the procedure. Further, this is useful in eliminating the waiting time such as data accumulation time for one frame in data compression and conversion to image data. As a result, it is possible to perform the data compression and the image data conversion at extremely high speed.

In the above, description has been given on a case where one camera is used. In a case where a plurality of cameras are used, the signal processing unit 5, the writing changeover unit 25, the first internal memories 6a and 6b, the shading compensation unit 24 and the data conversion unit 10, and the third internal memory 11 are provided as many as the number of cameras. Then, taking in of the data and compression and conversion of the data are carried out for each camera.

Figure 6:
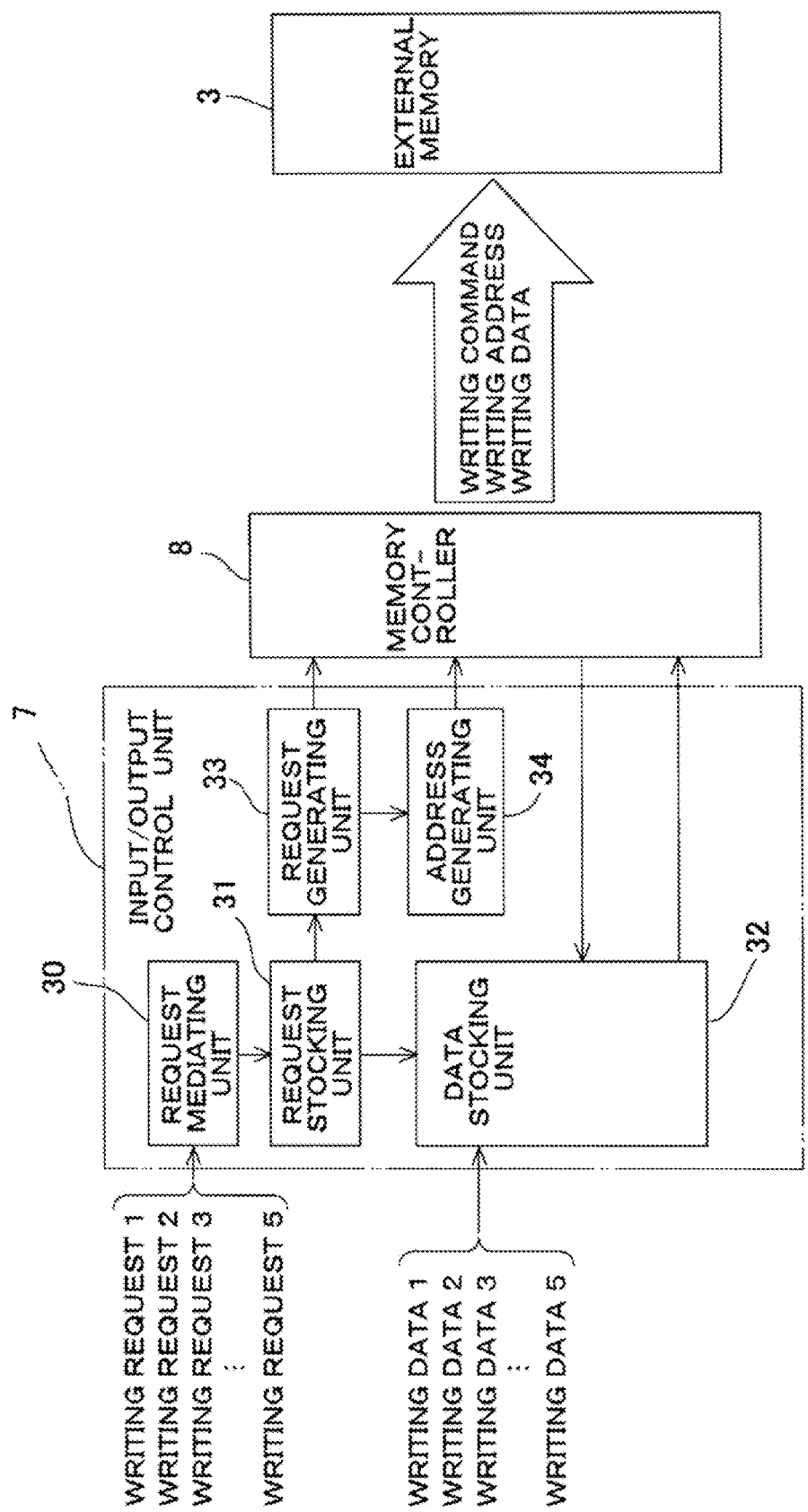
FIG. 6 is a block diagram of an input/output control unit of the image data processing device.

FIG. 6 shows a configuration of the input/output control unit 7 in a case where there are a plurality of cameras 23. In particular, a configuration of writing-in portion of the input/output control unit 7 is shown.

The input/output control unit 7 controls the writing-in of the image data outputted from a plurality of the third internal memories 11 to the external memories 3. Further, the input/output control unit 7 comprises a request mediating unit 30, a request stocking unit 31, a data stocking unit 32, a request generating unit 33, and an address generating unit 34.

When the image data after compression and conversion are accumulated in the third internal memory 11, writing requests 1 to 5 are issued from each of the third internal memories 11 respectively, and the writing requests 1 to 5 are inputted to the request mediating unit 30. The request mediating unit 30 adds priority ranking to the writing requests 1 to 5 and stores in the request stocking unit 31. The priority ranking is determined sequentially, starting from the one inputted earlier in terms of time so that there will be no waiting time or that the waiting time will be shortened.

Also, from the third internal memory 11, writing data corresponding to the writing requests 1 to 5 are outputted to the data stocking unit 32 and are temporarily stored in the data stocking unit 32.

The request generating unit 33 outputs the writing requests, e.g. the writing request 2, according to the priority ranking. The address of the writing data corresponding to the writing request 2 is determined by the address generating unit 34, and the address is inputted to the memory controller 8 together with the writing request 2. The memory controller 8 reads the writing data 2 (image data) corresponding to the writing request 2 based on the writing request from the data stocking unit 32, and writes the writing data 2 on the address of the external memory 3.

Image data outputted from a plurality of the third internal memories 11 are prepared for each camera in the external memories 3, and the image data is prepared for each frame.

Even in a case where the images are acquired by a plurality of cameras, images of uniform brightness can be acquired including the overlapping region for each of the cameras respectively. By overlapping the overlapping regions themselves, it is possible to prevent darkening on joints between the images, and an omnidirectional image with improved uniformity of lightness can be prepared.

Further, even in a case where images are acquired by a plurality of cameras, compression and conversion of the data are carried out at the same time as the taking in of the data, and only data converted to image data are sent to the external memories 3. Neither giving nor taking of the data before the conversion is performed between the image data processing device 20 and the external memory 3, and this contributes to the execution of the compression and conversion of the data at higher speed.

It is to be noted that in the embodiment as given above, an omnidirectional camera having 5 cameras is described, while the number of the cameras may be determined according to a field angle of the camera, and the number of the cameras is not limited to 5 cameras.

Also, the camera may not be a completed single camera, but it may be a camera which is configured by an image pickup element and an optical system installed in a camera housing.

Further, the input/output control unit 7 may be integrated with the memory controller 8 as an input/output control unit, and the input/output control unit may control giving and taking of signals between the image data processing device 20 and the external memory 3, writing to the external memory 3 and data reading. Also, the third internal memory 11 and the data stocking unit 32 may be used in common.

The invention claimed is:

1. An omnidirectional camera, comprising:
   a camera having an image pickup element and used for acquiring a digital image,
   an image data processing device for compressing signals outputted from said camera and for converting said signal to an image signal, and
   an external memory,
   wherein said image data processing device has:
      a signal processing unit for taking in said signal,
      a writing changeover unit,
      a set of two first internal memories,
      a signal compensation unit having a compensation coefficient for compensating signals from said first internal memories,
      a data conversion unit for converting the compensated signal from said signal compensation unit to an image signal,
      a third internal memory for temporarily storing the data after conversion outputted from said data conversion unit, and
      an input/output control unit for controlling the input/output of the data between said third internal memory and said external memory,
      wherein said writing changeover unit accumulates signals outputted from said signal processing unit in one of said first internal memories until the signals are accumulated to a predetermined amount, wherein the predetermined amount of signal accumulated in said first internal memory is an amount of minimal unit to which said data conversion unit can compress and convert the data, and when the signals are accumulated to the predetermined amount, said writing changeover unit changes the destination of accumulation and repeatedly accumulates in other first internal memories, and signals are outputted to said signal compensation unit from said first internal memory where signals have been accumulated to the predetermined amount, said signal compensation unit compensates the inputted signals based on said compensation coefficient corresponding to a position within said image pickup element, outputs compensated signals to said data conversion unit, said data conversion unit compresses and converts said inputted compensated signal to an image signal, and said image signal is sequentially inputted to said external memory by said input/output control unit.

2. The omnidirectional camera according to claim 1, wherein there are provided two or more cameras, and said signal processing unit, said writing changeover unit, a set of two said first internal memories, said signal compensation unit, said data conversion unit, said third internal memory are provided as many as the number of cameras to correspond to the number of cameras.

3. The omnidirectional camera according to claim 1, wherein said input/output control unit comprises a request mediating unit for giving priority ranking to each two or more writing requests inputted from said third internal memory, and a data stocking unit for temporarily storing the data outputted from said data conversion unit and converted data corresponding to said writing request, wherein the data after conversion is written in said external memory according to the priority ranking as given.

4. The omnidirectional camera according to claim 1, wherein said signal compensation unit carries out shading compensation to brightness of the image derived from optical system of the lens based on said compensation coefficient.

5. The omnidirectional camera according to claim 1, wherein said compensation coefficient is calculated according to a distance from a position where the luminance is at the maximum when a reference light is projected and also according to the decrease of brightness corresponding to said distance.

6. The omnidirectional camera according to claim 5, wherein the relation between said compensation coefficient and said distance is represented by a train of approximate straight lines.

7. The omnidirectional camera according to claim 5, wherein the relation between said compensation coefficient and said distance is represented by complex curves.

8. The omnidirectional camera according to claim 1, wherein said compensation coefficient is obtained from a table having said distance and a compensation coefficient corresponding to said distance.

9. The omnidirectional camera according to claim 1, wherein the predetermined amount comprises 8 pixels ×8.

* * * * *